US005503057A

United States Patent [19]

Smith, Jr.

[11] Patent Number: 5,503,057
[45] Date of Patent: Apr. 2, 1996

[54] PORTABLE COLLAPSIBLE DRUM STICK

[76] Inventor: Thomas Smith, Jr., 3035 Rancho Vista Blvd. Ste H260, Palmdale, Calif. 93551

[21] Appl. No.: 402,532

[22] Filed: Mar. 10, 1995

[51] Int. Cl.$^6$ .............................. G10D 13/02; F16L 15/02

[52] U.S. Cl. ............................ 84/422.4; D17/22; 285/302

[58] Field of Search ................................ 84/422.4, 452 R, 84/477 B; 224/230, 252, 269, 910; D17/22; D21/100; 285/302

[56] References Cited

U.S. PATENT DOCUMENTS

| | | | |
|---|---|---|---|
| 807,493 | 12/1905 | Phillips | 84/422.4 |
| 1,084,624 | 1/1914 | Gorson | 224/252 |
| 2,757,002 | 7/1956 | Ryden | 285/302 |
| 4,385,544 | 5/1983 | Heiskell | 84/422.4 |
| 5,260,506 | 11/1993 | Capella | 84/422.4 |
| 5,341,716 | 8/1994 | Donohoe | 84/422.4 |

*Primary Examiner*—Cassandra C. Spyrou

[57] ABSTRACT

A portable collapsible drum stick set comprising: a drum stick having at least one handle section and at least one movable section. Each section is formed in an elongated cylindrical configuration with two ends. The drum stick includes a handle section having a hollow interior with one open end and one closed end. Each end includes coupling devices. At least one movable section has a first end and a second end. Each end includes coupling devices. A first end of a movable segment includes an impact tip. Each movable section has a smaller outer diameter than the handle section. Each movable section is adapted to be coupled within the handle section or another movable section having a larger diameter. The coupling devices of the ends of each segment permit securing of the apparatus in an extended or collapsed configuration as desired by a user.

1 Claim, 3 Drawing Sheets

PORTABLE COLLAPSIBLE DRUM STICK

BACKGROUND OF THE INVENTION

1. Field of the Invention

The present invention relates to a portable collapsible drum stick set and more particularly pertains to conveniently transporting the drum sticks by positioning them in the collapsed orientation.

2. Description of the Prior Art

The use of drum sticks is known in the prior art. More specifically, drum sticks heretofore devised and utilized for the purpose of impacting a percussion instrument are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,170,001 to Amendola a drum stick.

U.S. Pat. No. 4,106,079 to Drury discloses a illuminated drum stick, baton.

U.S. Pat. No. 3,722,350 to Cordes discloses a metal drum stick.

U.S. Pat. No. Des. 297,546 to Seals discloses a drum stick.

U.S. Pat. No. 3,688,013 to Menard discloses a drum stick.

Lastly, U.S. Pat. No. 5,192,075 to Ashihara discloses a telescoping guard baton with rotatable cross handle.

In this respect, the portable collapsible drum stick set according to the present invention substantially departs from the conventional concepts and designs of the prior art, and in doing so provides an apparatus primarily developed for the purpose conveniently transporting the drum sticks by positioning them in the collapsed orientation.

Therefore, it can be appreciated that there exists a continuing need for a new and improved portable collapsible drum stick set which can be used for conveniently transporting the drum sticks by positioning them in the collapsed orientation. In this regard, the present invention substantially fulfills this need.

SUMMARY OF THE INVENTION

In view of the foregoing disadvantages inherent in the known types of drum sticks now present in the prior art, the present invention provides an improved portable collapsible drum stick set. As such, the general purpose of the present invention, which will be described subsequently in greater detail, is to provide a new and improved portable collapsible drum stick set and method which has all the advantages of the prior art and none of the disadvantages.

To attain this, the present invention essentially comprises a new and improved portable collapsible drum stick set comprising, in combination: at least two drum sticks, each drum stick being formed of three sections, each section being formed in an elongated generally cylindrical configuration with two ends, each end having a slightly smaller diameter than the remainder of the section, each drum stick including: a handle section having a hollow interior with one open end and one closed end, the closed end including a clip formed in a generally L-shaped configuration, the clip having a short portion affixed to the closed end of the handle section and a long portion positioned adjacent to the handle section, the free end of the clip having a generally semi-circular shaped notch affixed thereto, the clip permitting users to easily attach the device within a clothing pocket in the collapsed configuration, the handle permitting secure gripping by a user in the extended configuration, the open end including a radially inward directed ledge; a forward section formed in a solid configuration with a first end and a second end, the second end including a radially outward directed ledge, the first end including an impact tip, the impact tip being formed in a generally cylindrical configuration with an inboard end and an outboard end, the inboard end being formed contiguously with the forward section and including a projecting ridge, the outboard end of the tip having a smaller diameter than the inboard end with a gradually decreasing diameter therebetween, a pad being fabricated of elastomeric materials and formed in a generally semi-spherical shaped configuration, the pad being positioned around the impact tip of the forward section, the pad preventing damage to a percussion instrument when utilizing the apparatus; and a medial section having a hollow interior with one closed end and one open end, the open end including a radially inward directed ledge, the closed end including a radially outward directed ledge, the medial section having a smaller outer diameter than the handle section and positioned within the open end of the handle section, the ledge preventing uncoupling of the medial section therefrom, the second end of the forward section being positioned within the open end of the medial section, the ledge of the medial section preventing uncoupling of the forward section therefrom, the radially outward directed ledges of the forward and medial sections being fictionally secured within the open ends of the handle and medial sections in the extended configuration, the radially outward directed ledges of the forward and medial sections being fictionally secured adjacent to the closed ends of the handle and medial sections in the collapsed configuration, the apparatus being easily transportable in the collapsed configuration.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable collapsible drum stick set which has all of the advantages of the prior art drum sticks and none of the disadvantages.

It is another object of the present invention to provide a new and improved portable collapsible drum stick set which may be easily and efficiently manufactured and marketed.

It is further object of the present invention to provide a new and improved portable collapsible drum stick set which is of durable and reliable constructions.

An even further object of the present invention is to provide a new and improved portable collapsible drum stick set which is susceptible of a low cost of manufacture with regard to both materials and labor, and which accordingly is then susceptible of low prices of sale to the consuming public, thereby making such portable collapsible drum stick set economically available to the buying public.

Still yet another object of the present invention is to provide a new and improved portable collapsible drum stick set which provides in the apparatuses and methods of the prior art some of the advantages thereof, while simultaneously overcoming some of the disadvantages normally associated therewith.

Still another object of the present invention is to conveniently transporting the drum sticks by positioning them in the collapsed orientation.

Lastly, it is an object of the present invention to provide a new and improved portable collapsible drum stick set comprising: at least two drum sticks, each drum stick having at least one handle section and at least one movable section, each section being formed in an elongated cylindrical configuration with two ends, each drum stick including: a handle section having a hollow interior with one open end and one closed end, each end including coupling means; and at least one movable section having a first end and a second end, each end including coupling means, a first end of a movable segment including an impact tip, each movable section having a smaller outer diameter than the handle section, each movable section adapted to be coupled within the handle section or another movable section having a larger diameter, the coupling means of the ends of each segment permitting securing of the apparatus in an extended or collapsed configuration as desired by a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
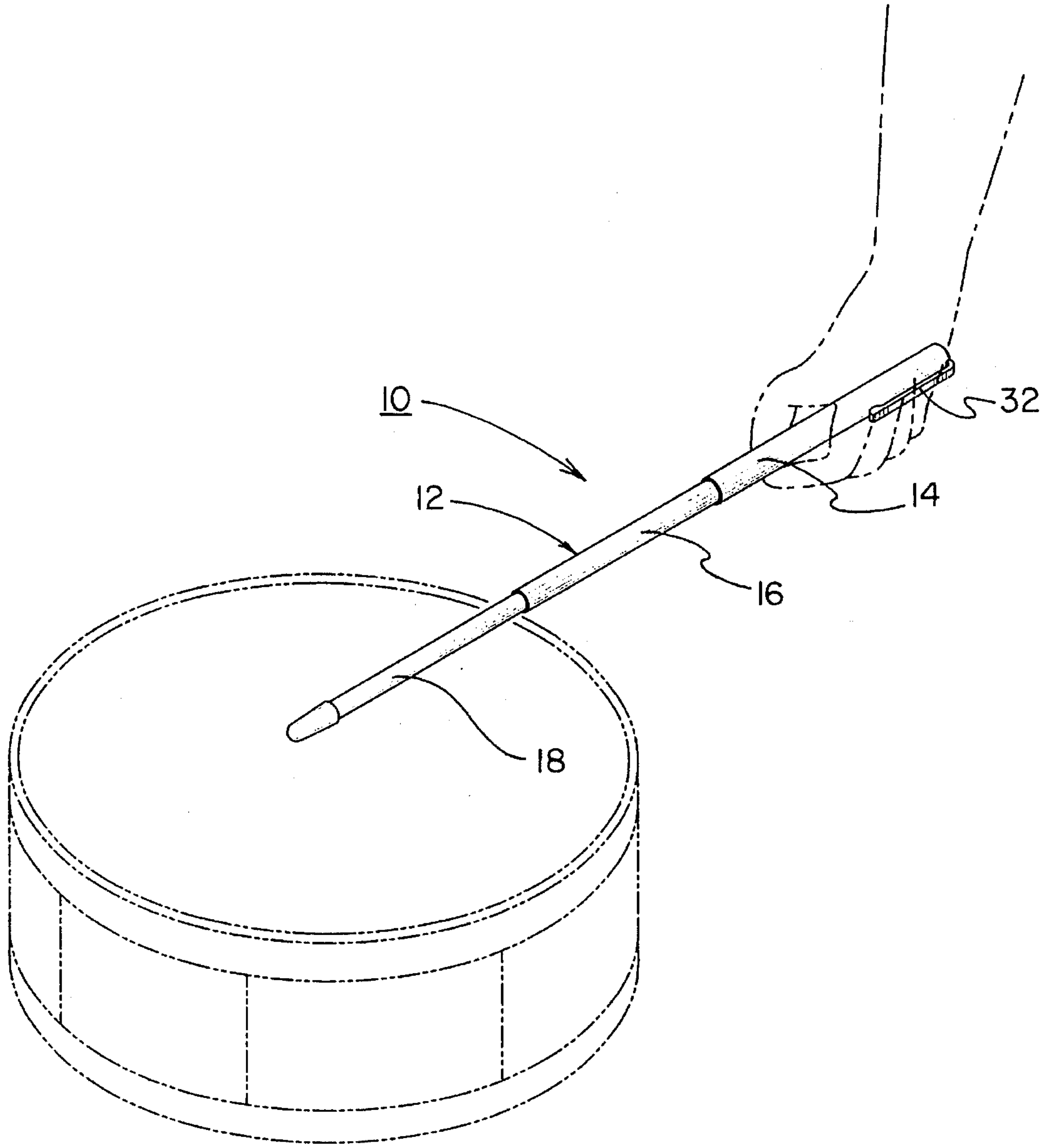
FIG. 1 is a perspective view of the preferred embodiment of the portable collapsible drum stick set constructed in accordance with the principles of the present invention.

With reference now to the drawings, and in particular to FIG. 1 thereof, the preferred embodiment of the new and improved portable collapsible drum stick set embodying the principles and concepts of the present invention and generally designated by the reference numeral 10 will be described.

The present invention, the portable collapsible drum stick set 10 is comprised of a plurality of components. Such components in their broadest context include a drum stick 12, a handle section 14, a medial section 16 and a forward section 18. Such components are individually configured and correlated with respect to each other so as to attain the desired objective.

More specifically, a drum stick is included with the apparatus. In alternative embodiments the apparatus includes four or more drum sticks. Each drum stick is fabricated of stainless steel and formed of three sections. Alternative embodiments include between two and five sections. Alternative embodiments of the apparatus are fabricated in a plurality of outer shell colors. One embodiment includes a gold plated outer shell and comes with a walnut case with brass name and initial plates. The interior of the walnut case includes a velvet lining and a resilient rubber drum pad. The drum pad can also be sold separate from the case. The drum pad enables users to practice whenever they so desire. Note FIG. 1.

Figure 2:
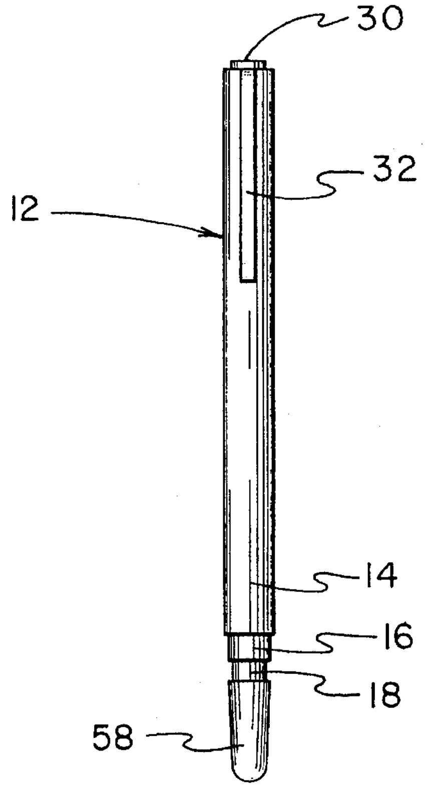
FIG. 2 is a front elevational view of the apparatus in the collapsed configuration.
Figure 3:
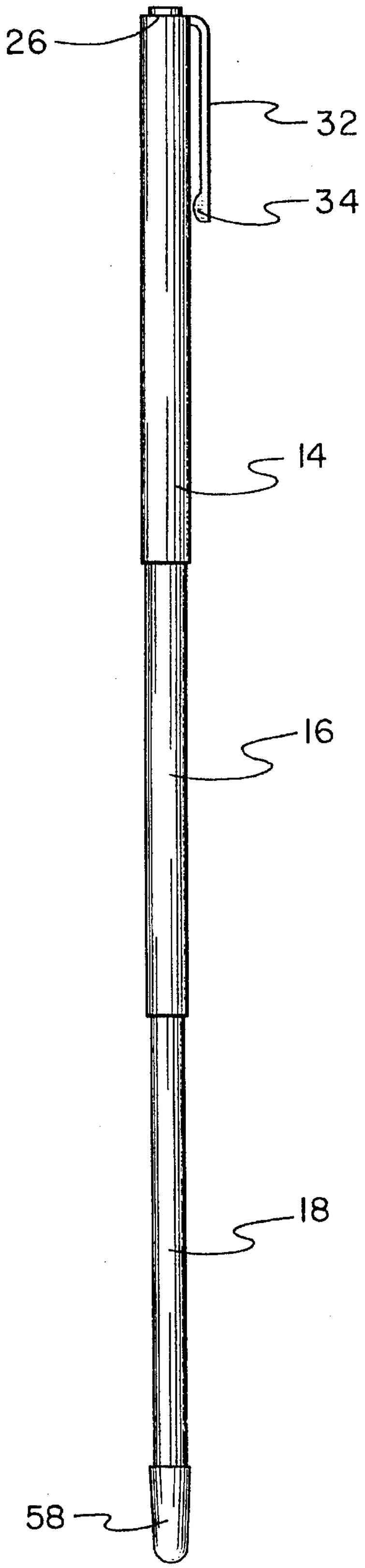
FIG. 3 is a side elevational view of the apparatus positioned in the extended configuration.

Each section is formed in an elongated generally cylindrical configuration with a forward end a rearward end. Each end has a slightly smaller diameter than the remainder of the section. The smaller diameter at each end enables the forward end of the handle and medial sections enable a user to frictionally secure the apparatus in the extended or collapsed configuration as desired by the user. Extension is accomplished by pulling and twisting the segments so that the outwardly directed ledges become fictionally secured within each other. Collapsing of the apparatus is accomplished by compressing and twisting the segments so that the outwardly directed ledges become fictionally secured within each other. Note FIGS. 2 and 3.

Figure 6:
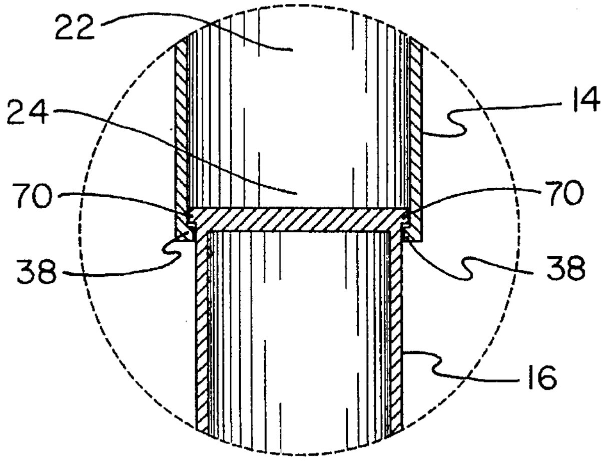
FIG. 6 is an enlarged cross sectional view of the intersection of the handle and medial sections taken along circle 6 of FIG. 4.

The drum stick includes a handle section 14 which has a hollow interior 22 with one open end 24 and one closed end 26. In the preferred embodiment the handle section is about 4 ¼ inches in length and about $^{6}/_{16}$ inch in diameter. The handle permits secure gripping by a user in the extended configuration. The open end includes a radially inward directed ledge 38. The radially outward directed ledge of the medial section is positioned within the handle section adjacent to the inwardly directed ledge to prevent uncoupling in the extended configuration. Note FIG. 6.

Figure 4:
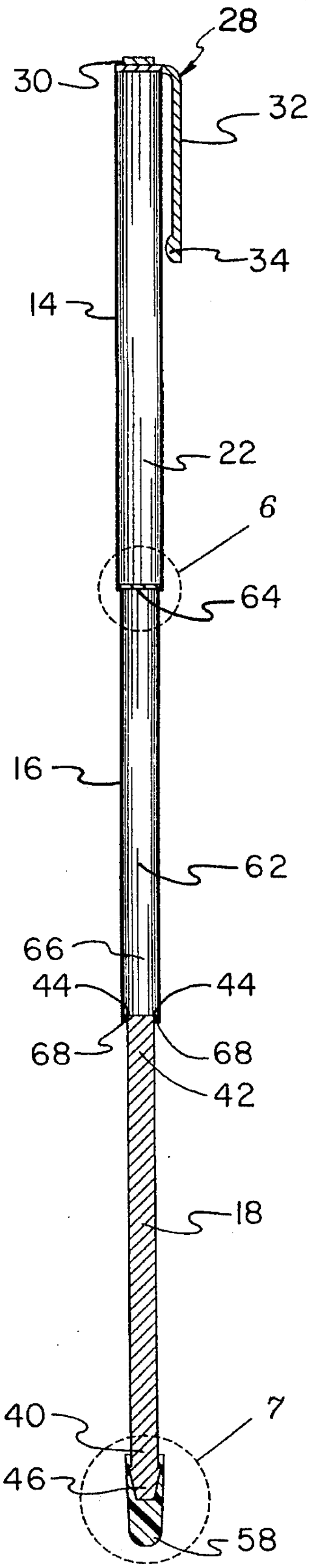
FIG. 4 is a cross sectional view of the apparatus shown in FIG. 3.
Figure 5:
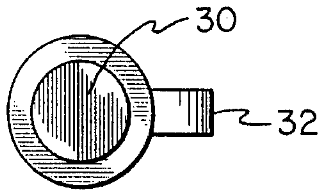
FIG. 5 is a top plan view of the apparatus illustrating the clip component.

The closed end includes a clip 28 formed in a generally L-shaped configuration. The clip is about 1 ⅝ inches in length. The clip has a short portion 30 affixed to the closed end 26 of the handle section and a long portion 32 positioned adjacent to the handle section. The free end of the clip has a generally semi-circular shaped notch 34 affixed to it. The clip permits users to easily attach the device within a clothing pocket in the collapsed configuration. The notch secures the clothing material tightly between the handle section and the clip to prevent inadvertent uncoupling. Note FIGS. 3 and 4.

A forward section 18 is formed in a solid configuration with a first end 40 and a second end 42. In the preferred embodiment the forward section is about 4 ¼ inches in length and about $^{4}/_{16}$ inch in diameter. The forward section includes a ¾ inch length tip. The second end includes a radially outward directed ledge 44. The radially outward directed ledge of the forward section is positioned within the medial section adjacent to the inwardly directed ledge to prevent uncoupling in the extended configuration. Note FIG. 4.

Figure 7:
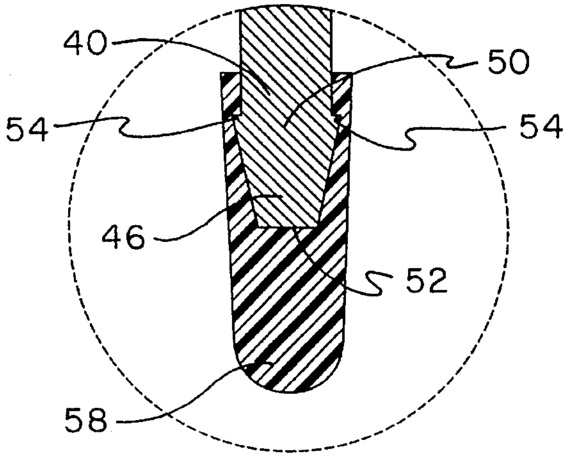
FIG. 7 is an enlarged cross sectional view of the impact tip of the apparatus taken along circle 7 of claim 4.

The first end includes an impact tip 46. The impact tip is formed in a generally cylindrical configuration with an inboard end 50 and an outboard end 52. The inboard end is formed contiguously with the forward section and includes a projecting ridge 54. The projecting ridge helps to retain the pad upon the impact tip in the operative orientation. The outboard end of the tip has a smaller diameter than the inboard end, with a gradually decreasing diameter therebetween. Note FIG. 7.

A pad 58 is fabricated of elastomeric materials and formed in a generally semi-spherical shaped configuration. The pad is positioned around the impact tip of the forward section. The pad prevents damage to a percussion instrument when utilizing the apparatus. The pad is easily replaceable if damaged during use. Note FIGS. 4 and 7.

A medial section 16 has a hollow interior 62 with one closed end 64 and one open end 66. The open end includes a radially inward directed ledge 68. The closed end includes a radially outward directed ledge 70. As previously explained, the ledges are configured so as to prevent uncoupling in the extended orientation, The medial section has a smaller outer diameter than the handle section and is positioned within the open end of the handle section, Note FIGS. 2 and 4.

The ledge prevents uncoupling of the medial section from the handle section, The second end of the forward section is positioned within the open end of the medial section, The ledge of the medial section prevents uncoupling of the forward section from the medial section, In the collapsed configuration the outwardly directed ledges are frictionally retained within the closed ends of the handle and medial sections, The apparatus is approximately five inches in length in the collapsed configuration. Note FIG. 2.

The radially outward directed ledges of the forward 44 and medial 70 sections are frictionally secured within the open ends of the handle and medial sections in the extended configuration. This is easily accomplished by pulling and twisting the sections. The radially outward directed ledges of the forward 44 and medial 70 sections are frictionally secured within the closed ends of the handle section 26 and medial section 64 in the collapsed configuration. The apparatus is easily transportable in the collapsed configuration. Note FIGS. 2, 4 and 6.

The portable collapsible drum stick set is formed of telescopically positioned sections. The apparatus consists of a pair of portable practice drum sticks. The sections are of a sufficient length, weight and balance to facilitate usage. Most drummers must carry the conventional drum sticks wherever they go in order to practice in their spare time. The portable collapsible drum stick set are used primarily for practice on a small resilient drum pad, or just the user's thigh as many drummers do. The apparatus may be manufactured in three separate models:

a. Standard: stainless steel
b. Designer series: a plurality of outer shell color tones inside standard bright stainless steel.
c. Executive series: gold plated outer shell inside standard bright stainless steel and comes with:
   (1) Walnut case with personalized brass plate on top for name or initials.
   (2) Brass company name plate inside top cover
   (3) Rich velvet lined lower interior portion of case with area to retain drum sticks.
   (4) Resilient rubber drum pad attached in lower interior portion for striking.

Other accessories: Desk top resilient drum pad.

Some advantages of the apparatus are as follows:

1. Beginning drummers and drummers can practice anytime anywhere.
2. They are small and compact.
3. Many people including busy executives who are: wanna-be's, used to be and still are's, can practice and or relieve tension and stress.
4. Make's a great conversational item and drummer status symbol.

Note: I use the apparatus everyday, throughout the day and have received good comments from three drum students who are using them.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved portable collapsible drum stick comprising, in combination:

a drum stick formed of three sections, the sections being formed in an elongated generally cylindrical configuration with a forward end and a rearward end, the drum stick being positionable in an extended configuration or a collapsed configuration, said three sections including:

a handle section having a hollow interior with one open end with a circumference and one closed end, the closed end including a clip formed in a generally L-shaped configuration with a free end, the clip having a short portion affixed to the closed end of the handle section and a long portion positioned adjacent to the handle section, the clip having a free end with a generally semi-circular shaped notch affixed thereto, the clip permitting users to easily attach the drum stick within a clothing pocket in the collapsed configuration, the handle permitting secure gripping by a user in the extended configuration, the open end including a ledge around the circumference;

a forward section formed in a solid configuration with a first end and a second end with a circumference, the second end including a ledge around the circumference, the first end including an impact tip, the impact tip being formed in a generally cylindrical configuration with an inboard end and an outboard end, the inboard end being formed contiguously with the forward section and including a projecting ridge, the outboard end of the tip having a smaller diameter than the inboard end with a gradually decreasing diameter therebetween, a pad being fabricated of elastomeric materials and formed in a generally semi-spherical shaped configuration, the pad being positioned around the impact tip of the forward section, the pad preventing damage to a percussion instrument when utilizing the drum stick; and a medial section having a hollow interior with one closed end and one open end with a circumference, the open end including a ledge around the circumference, the closed end including a radially outward directed ledge, the medial section having a smaller outer diameter than the handle section and positioned within the open end of the handle section, the ledge preventing uncoupling of the medial section therefrom, the second end of the forward section being positioned within the open end of the medial section, the ledge of the medial section preventing uncoupling of the forward section therefrom, the radially outward directed ledges of the forward and medial sections being frictionally secured within the open ends of the handle and medial section, respectively, in the extended configuration, the radially outward directed ledges of the forward and medial sections being frictionally secured within the closed ends of the handle and medial section, respectively, in the collapsed configuration, the apparatus being easily transportable in the collapsed configuration.

* * * * *